United States Patent [19]
Chu et al.

[11] Patent Number: 6,048,599
[45] Date of Patent: Apr. 11, 2000

[54] SUSCEPTOR COMPOSITE MATERIAL PATTERNED IN NEAT POLYMER

[75] Inventors: Kwang H. Chu; Armond D. Cosman, both of Austin, Tex.; Richard L. Miklos, Singapore, Singapore

[73] Assignee: 3M Innovative Properties Company, Saint Paul, Minn.

[21] Appl. No.: 08/785,564

[22] Filed: Jan. 17, 1997

[51] Int. Cl.⁷ .................. B32B 5/12; B32B 7/12; B29D 22/00; H05B 6/10
[52] U.S. Cl. ............ 428/114; 428/35.7; 428/349; 219/633; 219/634; 219/645; 219/759; 156/244.17; 156/272.4; 156/264; 156/272.2
[58] Field of Search ................... 428/114, 35.7, 428/349; 219/633, 634, 645, 759, 765, 690; 156/244.17, 272.4, 264, 272.2, 379.6

[56] References Cited

U.S. PATENT DOCUMENTS

| | | |
|---|---|---|
| 2,992,426 | 7/1961 | Borcherdt . |
| 3,802,985 | 4/1974 | Leatherman . |
| 4,253,898 | 3/1981 | Rinker et al. ............... 156/272 |
| 4,729,166 | 3/1988 | Lee et al. .................... 29/877 |
| 5,047,283 | 9/1991 | Leatherman et al. ........ 428/209 |
| 5,154,969 | 10/1992 | Kerawalla ................. 428/288 |
| 5,294,763 | 3/1994 | Chamberlain et al. ........ 219/729 |
| 5,399,295 | 3/1995 | Gamble et al. ............ 252/511 |
| 5,481,091 | 1/1996 | Grimm et al. ............. 219/633 |
| 5,695,847 | 12/1997 | Browne ................... 428/112 |
| 5,705,795 | 1/1998 | Anderson et al. .......... 219/633 |
| 5,710,413 | 1/1998 | King et al. ............... 219/633 |

FOREIGN PATENT DOCUMENTS

WO 91/19036  12/1991  WIPO .

*Primary Examiner*—James C. Housel
*Assistant Examiner*—S. Devi
*Attorney, Agent, or Firm*—John A. Fortkort

[57] ABSTRACT

A composite material for electromagnetic fusion bonding materials together includes interconnected first and second portions forming a patterned array. The first portions include layer absorptive magnetic particles in a polymer matrix. The second portions include a polymer positioned to separate each first portion from each other first portion.

19 Claims, 5 Drawing Sheets

SUSCEPTOR COMPOSITE MATERIAL PATTERNED IN NEAT POLYMER

BACKGROUND OF THE INVENTION

The present invention relates to electromagnetic-power-absorbing composites, and more specifically to such composites in the form of a sheet material for electromagnetic fusion bonding of thermoplastic materials.

A composite has been developed which can couple with electromagnetic power absorbed by the composite in a frequency range of 5 to 6000 MHz and efficiently convert the absorbed energy to heat. Within this broad range, suitable electromagnetic frequencies may be chosen for using such a composite in a wide variety of applications. For example, a composite which absorbs radio frequency (RF) power in the range of about 30 to 1000 MHz may be useful for some pipe joining applications. By choosing a relatively lower frequency, equipment for power generation and coupling may be reduced in size and/or cost.

The composite is an electromagnetic-power-absorbing material comprising a binder and a plurality of multilayered flakes dispersed in the binder. The multilayered flakes comprise at least one layer pair, each layer pair comprising one thin film crystalline ferromagnetic metal layer adjacent to one other thin film dielectric layer. The ferromagnetic metal preferably comprises a NiFe alloy. The multilayered flakes are preferably present in the range from about 0.1 to about 10% by volume of the composite. The composite is useful for absorbing electromagnetic power in the aforementioned frequency range and efficiently converting the absorbed electromagnetic energy to heat within the material. As used herein, "crystalline" means that the atoms comprising the grains of the thin film ferromagnetic metal layers are packed in a regularly ordered array having an identifiable structure. An "efficient" conversion means that the level of power which is applied to the electromagnetic-power-absorbing composite is at or below an acceptable level in order for the composite to reach a specified temperature within a desired period of time. The radio frequency (RF)-power-absorbing composite is efficient in a desirable frequency range of less than about 100 MHz for remote joining or splicing of polyolefin ducts for fiber optic communication cables using easily transportable equipment.

More specifically, the composite includes thin, metallic, layer-absorptive magnetic particle ("LAMP") flakes for compounding as susceptor materials in a high density polyethylene ("HDPE") matrix or resin. This compounding creates a LAMP composite susceptor material. This LAMP composite facilitates the creation of electromagnetically induced bonds having exceptionally strong lapshear adhesive strength. However, the peel strength is relatively low. This is because the LAMP flakes have a large particle size and poorly bond to the polyethylene matrix in which they are compounded.

The large flakes are beneficial because they have good heat efficiency. However, a drawback of the large flakes is that they have poor physical properties, e.g. poor bonding, poor peel strength and poor impact strength. If the flakes are made smaller to avoid these drawbacks, i.e. to improve the physical properties, there is a loss of desirable heat efficiency. Thus, a problem arises as to how to retain the heat efficiency of large flakes and avoid the problems associated with poor physical properties.

In addition, a preferred production process orients the LAMP flakes parallel to the magnetic field influx lines. Although this orientation maximizes the RF absorption efficiency, parallel orientation of the LAMP flakes increases the likelihood that a failure will occur flake-to-flake, due to the fact that the poor bonding between the flakes and the polyethylene substrate creates what amounts to voids in the matrix. Since the flakes are very thin, these "voids" are very thin, essentially acting to cause sharp incisions in the substrate. A matrix of resin having the potential for a large number of flakes is comparable to the resin having the potential for a large number of incisions running parallel to the bond line. When a peeling force is applied to this bond interface, stress concentrations along the edge of these "voids" increase dramatically, eventually rupturing the LAMP composite along a failure line which is parallel to the bond interface.

Large variations in temperature may damage the LAMP composites. The rate of thermal expansion and contraction between the polyethylene substrate and the LAMP flake varies significantly. For example, when subjected to extremely cold environments, the polyethylene substrate shrinks significantly, however, the LAMP flakes do not. Therefore, the substrate shrinks around each flake. The sharp edges of the flakes cut into the substrate and create residual stresses which weaken the LAMP composite, and increase susceptibility to failure parallel to the bond interface.

An application in which heating at an irregular bond line is required is the sealing of joined or spliced communication cable ends. Communication cables are typically constructed of a conductor bundle, surrounded by a metal strength and interference sheathing and an outer protective coating, typically of polyethylene. When such cables are spliced and rejoined, the strength and integrity of the rejoined cable is critical. An enclosure or closure body including end seals is used to sealingly surround the splice. A persistent problem in the use of splice closures and end seals involves the need for a complete seal about an often irregular surface, such as around a splice, end seals, cables and closure bodies.

A further drawback relates to an electrical arcing phenomenon which has caused failure in the bond interface. When an alternating magnetic field is applied to a composite sheet material, high potential differences are generated between adjacent LAMP flakes. This result is dictated by common principles of electromagnetism and induction. When the potential difference reaches a particular level, the LAMP flakes begin to arc to adjacent LAMP flakes, creating a plasma bridge between them. The plasma bridge vaporizes the polymer matrix in its immediate vicinity and either creates a void or otherwise degrades the physical properties of the polymer in the immediate vicinity. If this arcing continues, then the LAMP composite delaminates along a plane which is substantially parallel to the magnetic field influx lines. Although the probability of arcing may be reduced by orienting the LAMP flakes perpendicular to the field influx lines, doing so increases power consumption and decreases the efficiency of the electromagnetic fusion bonding device.

Because LAMP flakes are preferably relatively large susceptor particles, and represent only a small percentage of the total volume of the LAMP composite, the LAMP flakes must develop a high localized heat in order to melt the bulk of the polymer resin and then the polymer substrate. However, high temperatures can degrade the polymer in the composite and result in poor physical properties.

Therefore, what is needed is a composite which utilizes the large susceptor particles or flakes but which avoids the poor physical properties associated therewith. It is also highly desirable to improve the lap shear and peel strength of bonded joints; reduce stress at the joints to minimize initiation and propagation of stress cracking; limit overheating between bonding layers; improve the thermal stability of the polymers; improve long term product performance; and limit polymer degradation by avoiding arcing across the LAMP composite material during the bonding process.

SUMMARY OF INVENTION

The disclosed embodiments, accordingly, provide a sheet material for electromagnetic fusion bonding of thermoplastic material. To this end, a composite for electromagnetic fusion bonding materials together comprises a plurality of composite electromagnetic portions including susceptor particles uniformly distributed adjacent polymer portions. The composite portions are bonded to each adjacent polymer portion. In this manner, the composite portions and the polymer portions form a patterned array of alternating portions.

A principal advantage is that lap shear and peel strength of bonded joints is improved and joint stresses are reduced. Also improved is the thermal stability of polymers, which limits overheating and avoids arcing across the composite material during the bonding process and thus improves product performance.

DESCRIPTION OF THE PREFERRED EMBODIMENT

Figure 1:
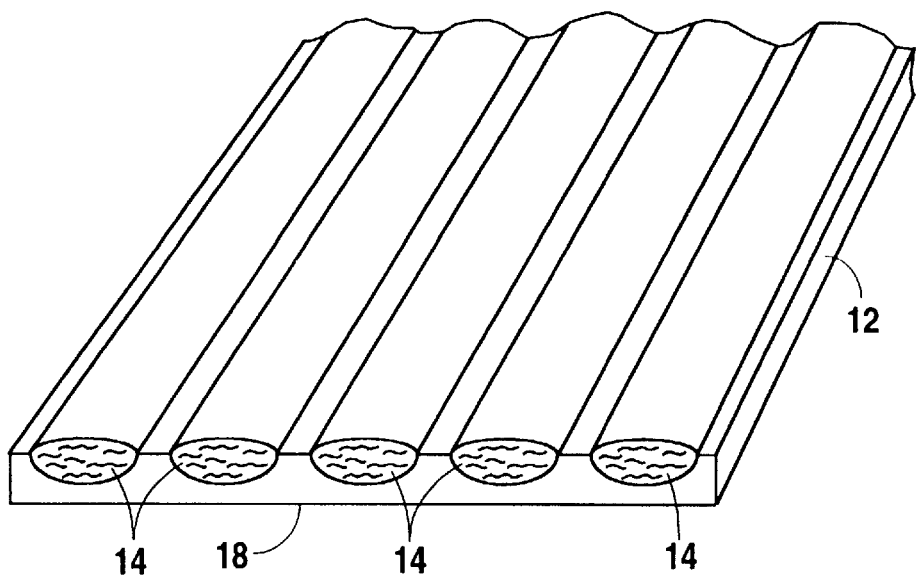
FIG. 1 is a perspective view illustrating an embodiment of a composite sheet material.

Referring to FIG. 1, a composite sheet 12 for induction-bonding thermoplastic and thermoset plastic components together, includes a number of electromagnetic LAMP composite strips 14 uniformly distributed on a polymer substrate 18. The preferred polymer substrate 18 is neat polyethylene. The LAMP composite strips 14 are bonded to the polymer substrate 18, in a spaced-apart relationship.

Figure 2:
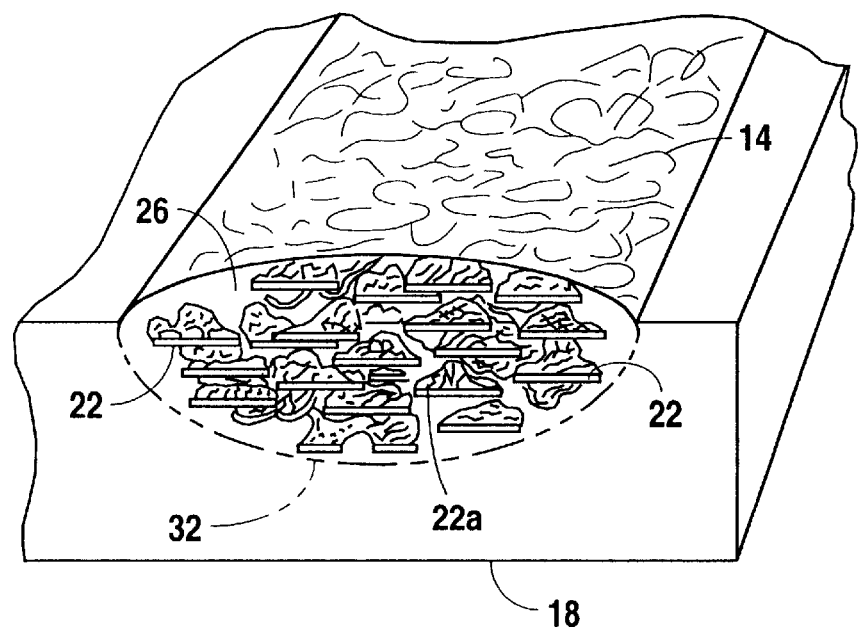
FIG. 2 is an exploded view partially illustrating an embodiment of a region of the composite sheet material of FIG. 1.

LAMP composite strips 14, FIG. 2, are made of a LAMP composite which includes LAMP flakes 22, including a surface 22a, compounded in a polymer matrix or resin 26. The resin 26 is preferably high-density polyethylene. The LAMP flakes 22 are electromagnetic susceptor particles, which are dispersed throughout the resin 26 prior to the latter being extruded over the polymer substrate 18. The LAMP flakes 22 are conventional, and can, for example, be in the form of ferrites (such as those manufactured by Steward Corporation of Chattanooga, Tenn.). As an example, the LAMP composite strips 14 may be formed including 4% by volume of LAMP flakes 22. The strips 14 are fusion-bonded along a fusion boundary 32 to polymer substrate 18 after the extrusion process.

Figure 3A:
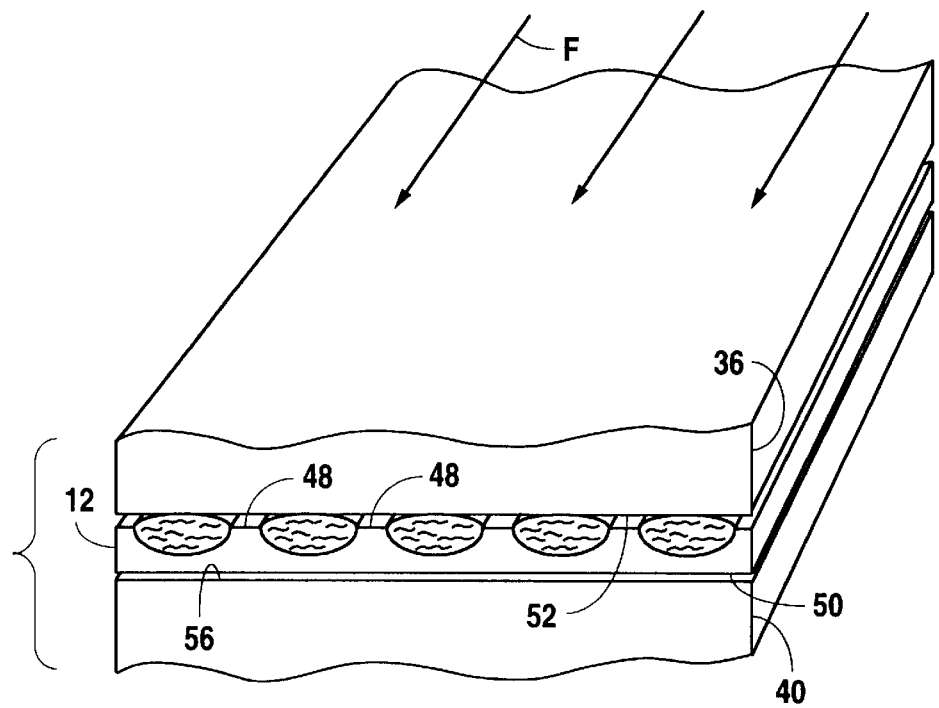
FIG. 3A is a perspective view illustrating an embodiment of a pre-induction heated, composite sheet material, interposed between two components to be bonded.
Figure 3B:
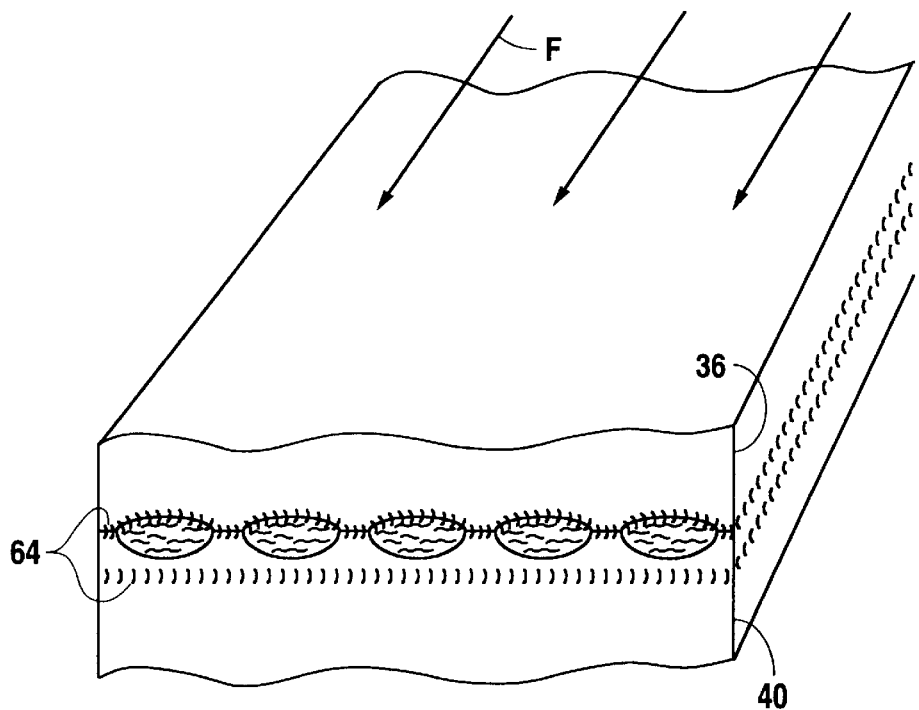
FIG. 3B is a perspective view of the components depicted in FIG. 3, after induction heating, and showing the bond interface.

Composite sheet 12, FIG. 3A, is sandwiched between a first thermoplastic sheet 36 and a second thermoplastic sheet 40 for the purpose of bonding the sheets 36, 40 together by means of the introduction of an alternating magnetic field. Surface 48 of sheet 12 and an adjacent surface 52 of sheet 36 are to be bonded together as well as surface 50 of sheet 12 and an adjacent surface 56 of sheet 40. The alternating magnetic field is applied to the sheets and the field has a plurality of exemplary flux lines oriented in a direction indicated by the directional arrows designated $F_1$ in FIGS. 3A and 3B. It can be seen in FIG. 3B that application of the field as stated above results in sheets 12, 36 and 40 being electromagnetically fusion bonded together into a single sheet having a common interface 64, which is exaggerated in FIG. 3B for the purpose of illustration only.

Figure 4A:
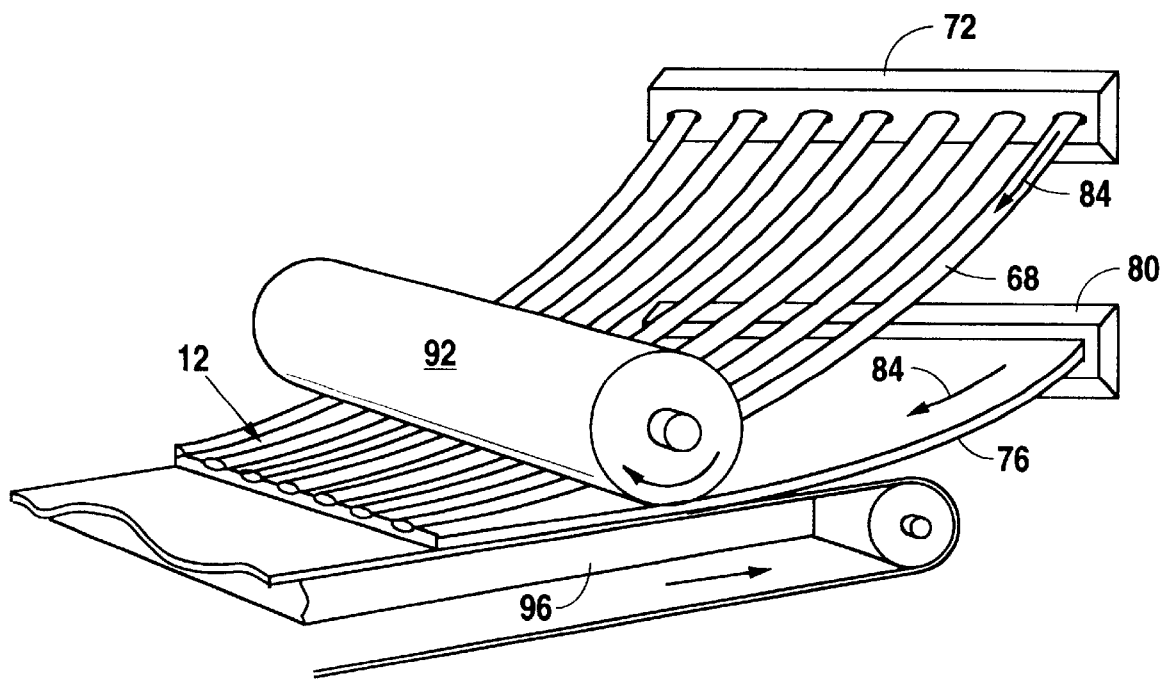
FIG. 4A is a perspective view illustrating an embodiment of a method of making the composite sheet material.
Figure 4B:
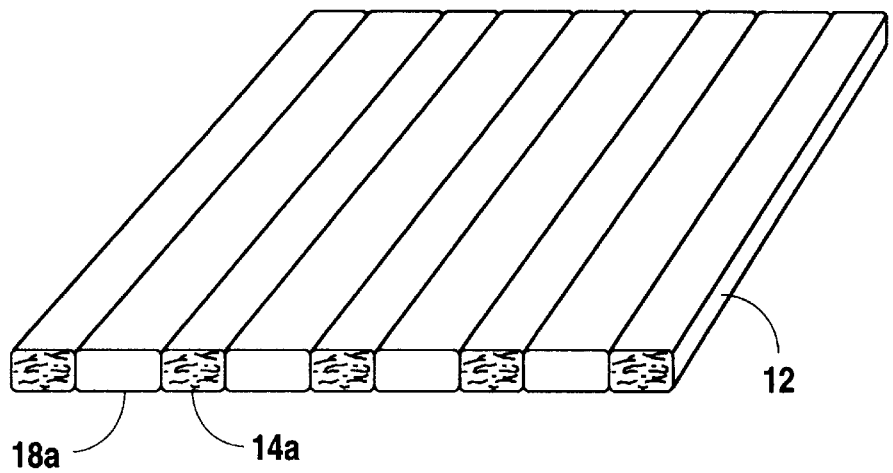
FIG. 4B is a perspective view illustrating an embodiment of the composite sheet material made by another method.

A method is shown, (FIG. 4A), for making the composite sheet 12. The method is an extrusion and lamination process. A LAMP composite extrudant 68 extrudes from an extrusion die 72 simultaneously as a neat polyethylene substrate extrudant 76 extrudes from an adjacent extrusion die 80. Because the LAMP flakes 22 are generally planar, as is the case with ferrites and certain other susceptor particles, the LAMP flakes tend to orient themselves with their substantially planar surfaces 22a (FIG. 2) parallel to an extrusion direction, indicated by arrows 84. That is, the forces during extrusion are largely directed parallel to the flow of material out of the extrusion dies 72, 80. As a consequence, the LAMP flakes 22 orient themselves in the position of least resistance to the extrusion forces, an orientation in which the surface 22a, (FIG. 2) of a representative flake 22 has a surface vector pointing substantially perpendicular to the extrusion direction 84. Almost immediately after exiting the dies 72, 80, the extrudants 68, 76 are drawn away from the die at a constant rate which is substantially equivalent to the extrusion rate. While the extrudants 68, 76 are still in a plastic state, a roller 92 and a support plate 96 apply pressure to urge the extrudants 68, 76 together which enables the fusion-bonding of the extrudants 68, 76 to form the composite sheet 12. If desired, composite sheet 12a (FIG. 4B) can be made by a coextrusion process, where two extruders (not shown) pump the molten polymers through a die to form side-by-side strips of neat polymer 18a and composite 14a.

Sheet 12b, (FIG. 5), may be formed in a tubular configuration for uses such as where sheet 12 may be wrapped around a cable or a pipe, for example. One possible use includes sealing end seals for communication cable splices where an end seal having an annular circumference is sealed within an annular end of a cable splice closure housing. Other possible uses include the sealing of a cable surface in an annular cable port in an end seal of the type used in conjunction with the above-mentioned cable splice closure housing. In the examples, sheet 12b may be positioned so that an inner surface 50b engages one annular surface to be sealed and outer surface 48b engages an adjacent annular surface to be sealed. In this manner, sheet 12b can be electromagnetically fusion bonded to adjacent annular surfaces to form an airtight and watertight seal.

Figure 5:
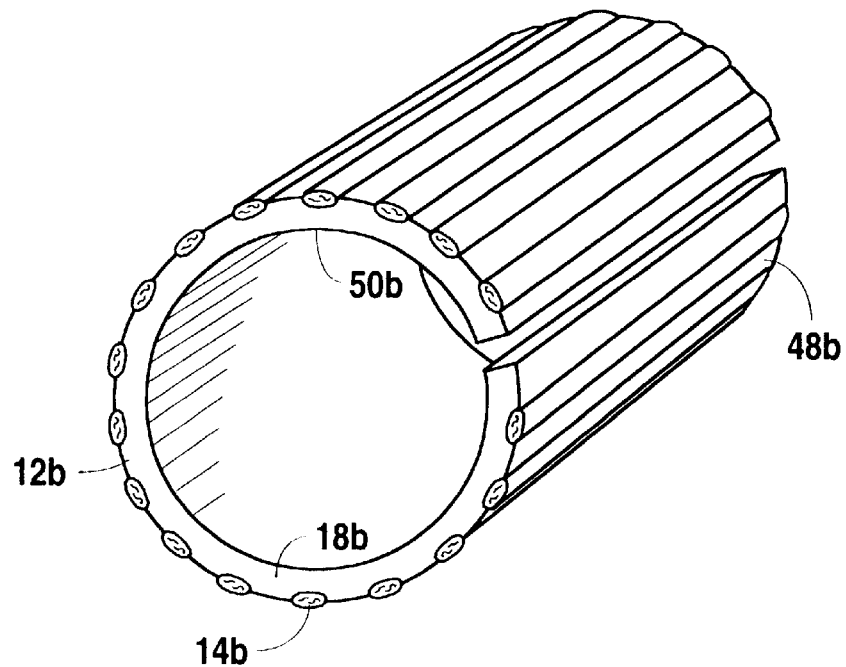
FIG. 5 is an isometric view illustrating an embodiment of the composite material formed into a cylinder.

Arcing, as previously mentioned, is particularly likely when sheet 12b is configured as shown in FIG. 5. Arcing is undesirable because an arc generates extremely high localized heat which vaporizes and degrades the polymer in the area of the arc's path. Arcing can also propagate through the host composite resulting in delaminating or significant weakening of the composite. By separating composite strips 14b with the neat polymer substrate 18b, the effects of the arcing phenomenon is significantly limited.

Figure 6:
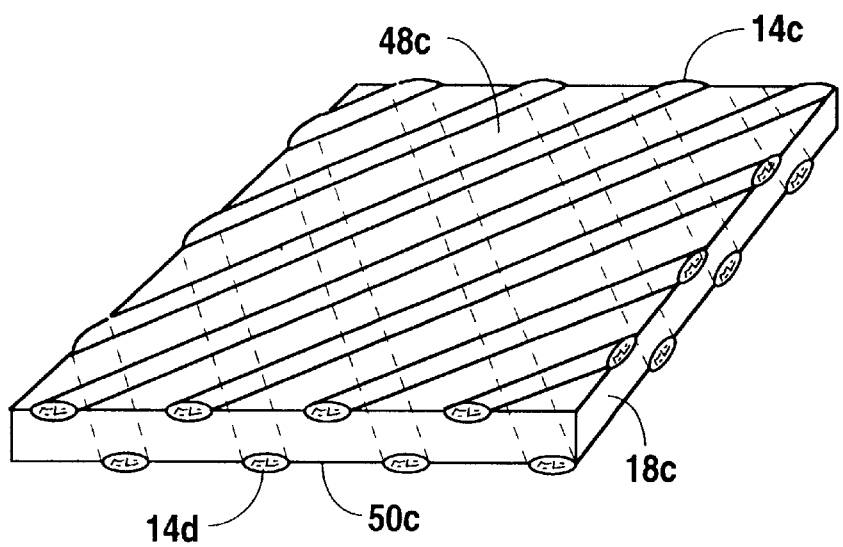
FIG. 6 is an isometric view illustrating an embodiment of a criss-cross pattern of composite material.

In another embodiment, FIG. 6, the LAMP composite strips 14c are spaced-apart from adjacent parallel strips which are bonded to an upper surface 48c of the polymer substrate 18c, and lower parallel strips 14d are bonded to a lower surface 50c of the polymer substrate 18c in the same manner as the upper parallel strips 14c. However, the lower strips 14d bond to the polymer substrate 18c in an angled orientation with respect to the upper strips 14c, thus creating a net configuration. The net configuration provides improved heat distribution due to the double sided arrangement of the strips 14c, 14d on substrate 18c.

Figure 7A:
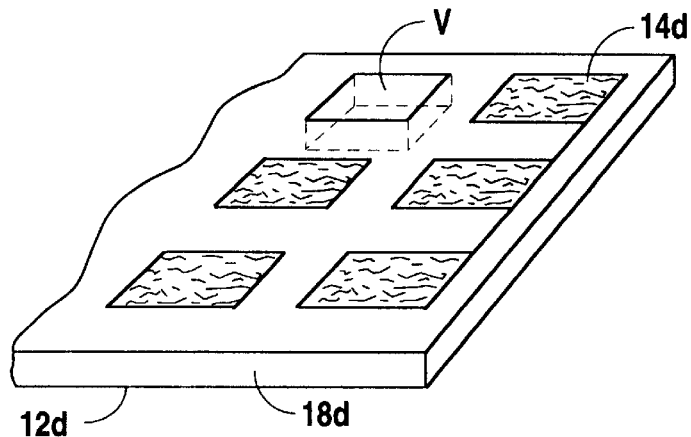
FIGS. 7A–C are isometric views illustrating an embodiment of a square pattern of composite material.
Figure 7B:
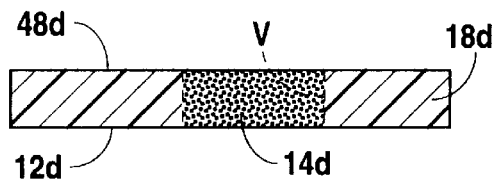
Figure 7C:
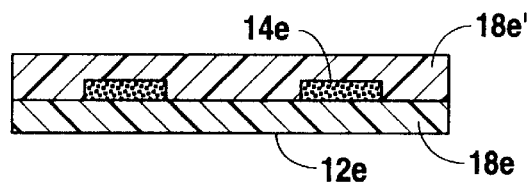

Another configuration for forming an array of composite material on a neat substrate is illustrated in FIGS. 7A–C. In this configuration a composite sheet 12d includes a substrate 18d of neat polyethylene having composite squares 14d arrayed thereon. This can be accomplished in several ways. First, sheet 12d can be die cut to form voids V therein, as shown in FIG. 7B. Composite material can then be used to fill voids V by any suitable method, thus forming composite squares 14d. Excess composite can be scraped from surface 48d of sheet 12d so that sheet 12d has clearly defined composite squares 14d within neat substrate 18d. This effect could also be achieved without the die-cut step by depositing squares 14e on neat substrate 18e in the desired array, followed by a laminating step of adding a covering layer 18e' FIG. 7C so as to sandwich squares 14e between substrates 18e and 18e' to form a sheet 12e. It should be readily apparent that the composite shape can be varied, i.e. 14d and 14e may be of any desired configuration, e.g. hex, circle, diamond, etc. Also, it is recognized that the order of the array could be reversed so that the sheet (not shown) could comprise a composite substrate having a neat polyethylene array thereon. However, this arrangement would only apply to particular applications such as where the sheet is used in a flat or substantially flat form. If used in a cylindrical form such as previously discussed (FIG. 5) the possibility of arcing would be enhanced.

Figure 8:
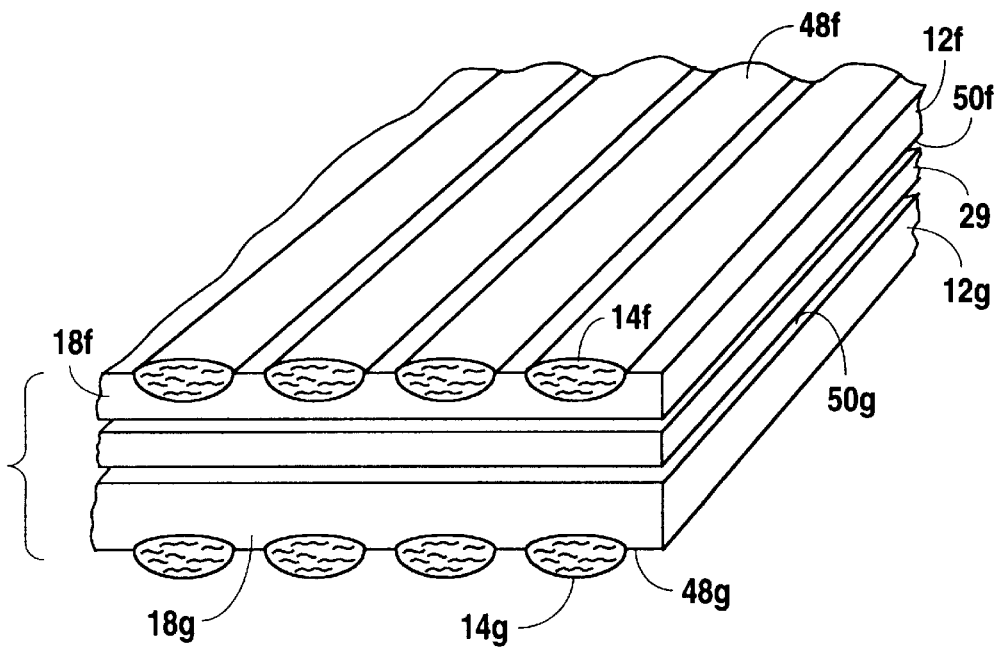
FIG. 8 is a perspective view illustrating an embodiment of a tie layer of material for bonding two incompatible composite sheets together.

For bonding surfaces of two incompatible polymers, e.g. polypropylene and polyethylene, a first composite sheet 12f, (FIG. 8), may be bonded to a second composite sheet 12g by means of a polymer tie layer 29 formed of an ethylene vinyl acetate, for example. Tie layer 29 could also include a composite array as discussed above. Sheet 12f includes a neat polypropylene substrate 18f having composite strips 14f laminated thereon on a surface 48f in the above-mentioned manner. Sheet 12g includes a neat polyethylene substrate 18g having composite strips 14g laminated on a surface 48g thereof. A surface 50f of sheet 12f and a surface 50g of sheet 12g engage tie layer 29. In this manner, sheets 12f and 12g can be electromagnetically fusion bonded to each other via tie layer 29.

As it can be seen, there are several advantages to the embodiments discussed above. The polymer substrate limits the propagation of an arc from one LAMP composite strip to an adjacent strip. Essentially, the intervening neat polymer substrate functions as an insulating barrier between the LAMP composite strips. This insures that the components which bond together will maintain, as a minimum, the bond strength attributable to their bond interface with the neat polymer substrate. The resulting composite sheet effectively seals and bonds plastics together. The composite sheet also simultaneously creates a bond which has a high peel strength, and which is ideal for maximum magnetic field absorption and, consequently, heating with greater efficiency. Again, because minimal field is lost when the LAMP flakes are oriented substantially parallel to the plane of the strip, a superior efficiency of energy is achieved. Also, the composite sheet is particularly applicable for electromagnetic induction-bonding applications in which the heating must be confined to an area that is not easily accessible, or to an area near the bond line. Further, the composite sheet achieves uniform heating in an efficient manner. The resulting electromagnetic fusion-bond has a high peel strength, and has low thermally-induced, residual stresses. Furthermore, because there are no LAMP flakes in the neat polymer substrate, overheating and polymer degradation due to arcing, do not occur in this region, despite possible overheating and degradation in the LAMP composite. Therefore, as a minimum, improved bonds are formed between the neat polymer substrate and the bonded components.

Although illustrative embodiments have been shown and described, a wide range of modification, change and substitution is contemplated in the foregoing disclosure and in some instances, features of the embodiments may be employed without a corresponding use of other features. Accordingly, it is appropriate that the appended claims be construed broadly and in a manner consistent with the scope of the embodiments disclosed herein.

What is claimed is:

1. A composite material for electromagnetic fusion bonding, comprising:

first and second phases comprising first ard second diverse polymers, respectively, said second phase having a plurality of electromagnetic susceptor particles disposed therein;

wherein said second phase is disposed in a patterned array with respect to said first phase.

2. The composite material of claim 1, wherein said composite material comprises alternating regions of said first and second phases.

3. The composite material of claim 1, wherein said composite material comprises a plurality of strips of said second phase disposed within a matrix of said first phase.

4. The composite material of claim 1, wherein said composite material comprises a plurality of strips of said second phase disposed upon a substrate comprising said first phase.

5. The composite material of claim 4, wherein said composite material comprises a plurality of strips of said second phase disposed upon opposing surfaces of a substrate comprising said first phase.

6. The composite material of claim 3, wherein each of said plurality of strips are separated from each other by said first phase.

7. The composite material of claim 4, wherein each of said plurality of strips are separated from each other by said first phase.

8. The composite material of claim 1, wherein said composite material comprises a plurality of strips of said second phase which are spaced apart and embedded into a substrate comprising said first phase.

9. The composite material of claim 1, wherein said composite material comprises a plurality of plate-like bodies of said second phase disposed within a matrix of said first phase.

10. The composite material of claim 1, wherein said composite material comprises a plurality of plate-like bodies of said second phase disposed upon a substrate comprising said first phase.

11. The composite material of claim 10, wherein said composite material comprises a plurality of plate-like bodies of said second phase disposed upon opposing surfaces of a substrate comprising said first phase.

12. The composite material of claim 9, wherein each of said plurality of strips are separated from each other by said first phase.

13. The composite material of claim 10, wherein each of said plurality of strips are separated from each other by said first phase.

14. The composite material of claim 1, comprising a sheet of alternating side-by-side strips of said first and second phases.

15. The composite material of claim 1, wherein said second phase comprises a plurality of layer absorptive magnetic particles compounded in a matrix of said second polymer.

16. The composite material of claim 1, wherein said second polymer is polyethylene.

17. The composite material as defined in claim 16, wherein said polymer is high density polyethylene.

18. The composite material of claim 1, wherein said second phase is disposed in criss-crossing strips which form a net-like pattern, said strips being spaced apart and embedded into a substrate of said first polymer.

19. A composite material for electromagnetic fusion bonding, comprising:

first and second phases comprising first and second diverse polymers, respectively, said second phase having a plurality of electromagnetic susceptor particles disposed therein;

wherein said second phase is disposed in a patterned array of elements with respect to said first phase and wherein said first phase is positioned to separate each second phase element from each other second phase element.

* * * * *